Patented June 27, 1950

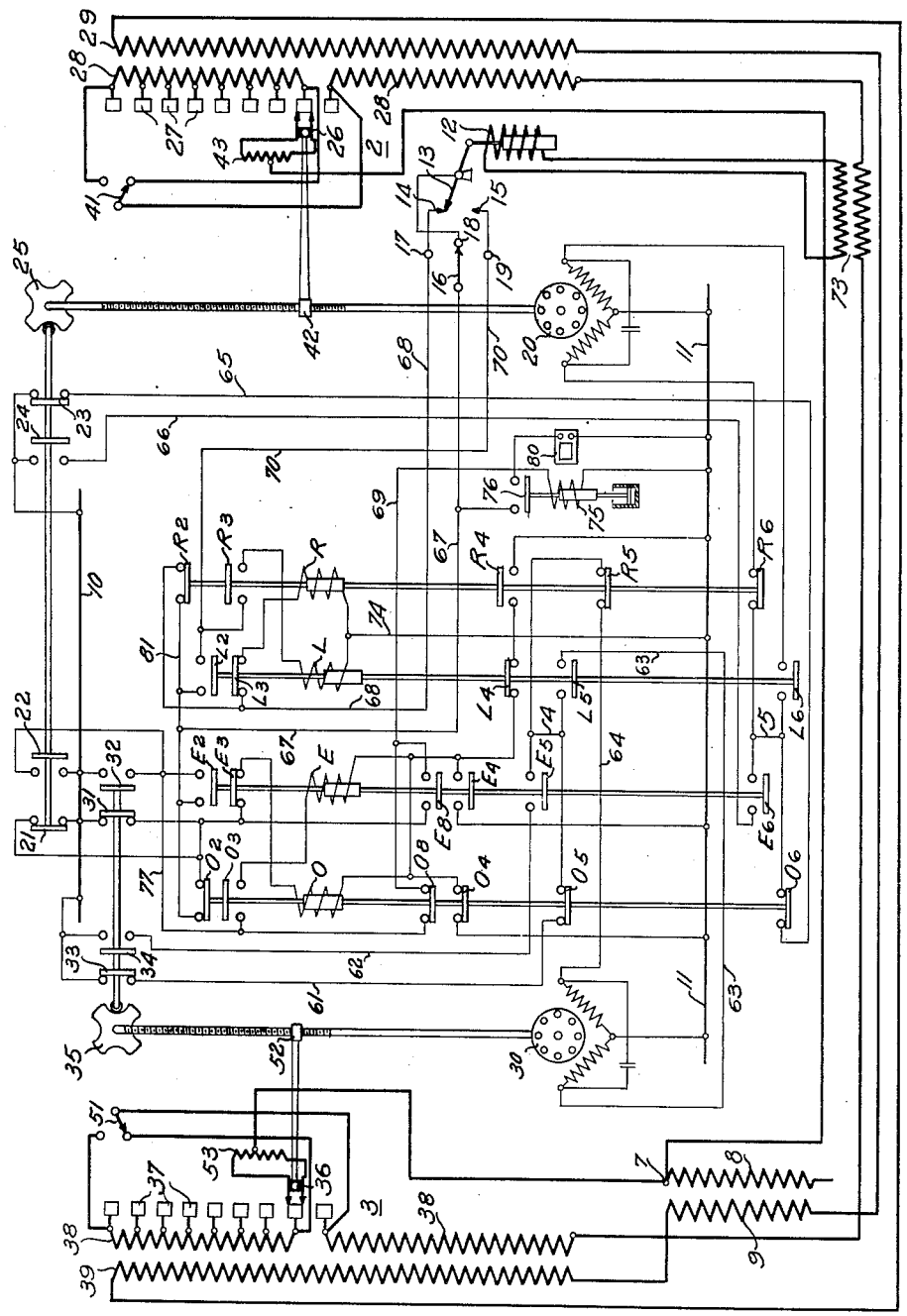

2,512,989

UNITED STATES PATENT OFFICE 2,512,989

STEP REGULATOR CONTROL SYSTEM

Louis C. Aicher, Wauwatosa, Wis., assignor to Allis-Chalmers Manufacturing Company, Milwaukee, Wis., a corporation of Delaware Application July 27, 1945, Serial No. 607,358

5 Claims. (Cl. 318—103)

This invention relates in general to voltage regulating systems and particularly to such systems when including two or more transformer tap changing regulators functioning on interconnected regulated circuits.

Where a plurality of voltage regulators is utilized on interconnected circuits, it is desirable to keep these regulators in step so that one regulator will not attempt to provide one regulated voltage and other regulators attempt to supply different regulated voltages. Complicated multi-relay circuits have been utilized with regulators having relatively slow moving mechanisms, however, when such regulating systems are utilized with regulators having quick break or snap action mechanisms, the relays could not properly function because of the exceedingly small time involved in a regulator moving from one tap position to another. The great number of relays involved provided disadvantages due to contact troubles.

It is therefore an object of the present invention to provide an improved control circuit whereby a plurality of regulators may be kept in step with a minimum number of relays.

It is also an object of the present invention to provide an improved relay circuit and apparatus for maintaining a plurality of tap changing regulators in step, which relay circuit utilizes a minimum of relays so connected that the same number of relays is used independently of whether the circuit controls two or more regulators.

It is a further object of the present invention to provide a control circuit of the above type which will operate satisfactorily independently of the time available during a tap change for energizing the relays of the control circuit.

It is also an object of the present invention to provide a relay circuit for maintaining a plurality of quick break tap changing regulators in step.

Objects and advantages other than those above set forth will be apparent from the following description when read in connection with the single figure of the drawing, which shows a schematic diagram of connections of a control circuit embodying the present invention.

The drawing shows two step type transformer tap changing regulators 2 and 3 which are shown interconnected with the windings 8 and 9 in a polyphase circuit. The high voltage windings 29, 39 and 9 are shown connected in delta and the secondary windings 28, 38 and 8 are shown star connected. The transformer windings of the regulators could as well be single phase and connected in parallel for regulating a single phase line or in any other circuit where it is desired that the regulators be maintained in like regulating positions.

The regulators diagrammatically shown may be of the type shown in the United States patent to L. H. Hill, No. 2,177,109, October 24, 1939, Voltage Regulator, in which reversible motors 20 and 30 drive quick break mechanisms, indicated at 42 and 52, so that movable contacts 26 and 36 move with a rapid snap action from one position, relative to contacts 27 and 37, to another position. Reversing switches 41 and 51 are supplied so as to double the number of available tap positions. The preventive autotransformers 43 and 53 are utilized to limit the circulating current when the movable contacts 26 and 36 are in a position bridging two contacts 27 and two contacts 37.

Both regulators 2 and 3 are controlled to raise or lower the regulated voltage by means of a primary relay or contact making voltmeter 12 energized from a potential transformer 73 shown connected between two phases of the low voltage windings 28 and 38. The relay 12 has a movable contact 13 which is shown closed with a contact 14 in the position providing for running the regulators 2 and 3 to raise the regulated voltage. A similar contact 15 is provided for running the regulators 2 and 3 to lower the regulated voltage. A manually operated switch 16 cooperates with contacts 17 and 19 to manually control the regulators to raise or lower the voltage, or when in the position shown in which it is closed with contact 18, to provide for automatic operation by means of the primary relay 12.

In order to provide a simple control system for maintaining both regulators 2 and 3 in step, that is, on similar tap positions, position switches 31, 32, 33 and 34 are provided for actuation in accordance with movement of the movable contacts 36, and position switches 21, 22, 23 and 24 are provided for actuation in accordance with the position of the movable contacts 26. These position switches are actuated by cam type actuators 25 and 35 and the switch contacts are arranged as shown so that switches 21, 23, 31 and 33 will be closed when the regulators are in the odd positions, that is, when both brushes of the movable contacts 26 and 36 are on the same contacts 27 and 37, and switches 22, 24, 32 and 34 which are closed when the movable contacts 26 and 36 are in the even position, that is, when the brushes of movable contacts 26 and 36 are each on different contacts 27 and 37.

Two selector relays O and E are provided for setting up circuits for energizing one or the other of the lower or raise relays L and R (dependent upon the position of primary relay 12), and for energizing in a proper direction the motors 20 or 30. One or the other of the selector relays O and E is closed whenever the supply lines 10 and 11, which provide a source of energization for the control circuits and the motors 20 and 30, are energized.

As shown in the drawing, the selector relay O is energized through a circuit extending from line 10 through odd position switches 21 or 31, normally closed contacts E3 of the relay E, coil O, normally open sealing in contacts O4 to line 11, which relay is thus maintained in the energized position shown. If the regulated voltage has dropped below its desired value, the coil of primary relay 12 will not be energized sufficiently to counteract the weight of the primary relay core and the relay will take the position shown in the drawing in which contacts 13 and 14 are closed.

With the contacts of the primary relay as shown in the drawing, a circuit is set up for energization of the relay R through a contact of the selector relay O. This circuit may be traced from line 10 through an odd position switch 21 or 31, through contacts O2, conductor 67, manual switch 16, 18, contacts 13 and 14 of the primary relay, conductor 68, normally closed contacts L3, coil R and conductor 74 to line 11. Relay R seals itself in through the normally open contacts R2 which shunt the contacts 13, 14 of the primary relay.

Motor 20 is therefore energized, in a direction to move the contacts 26 to raise the regulated voltage, by means of a circuit from conductor 10 through odd position switch 23, conductor 65, contacts O6, conductor 5, contacts R6, one winding of motor 20 to conductor 11. Motor 30 is similarly energized through a circuit from line 10 through odd position switch 33, conductor 61, contacts O5, conductor 4, contacts R5, one winding of motor 30 to conductor 11.

When motor 20 moves contacts 26 to the next even position where the brushes bridge two contacts 27, the position actuator 25 will have moved (45 degrees in the illustrative embodiment) so that odd position switches 21 and 23 are opened and even position switches 22 and 24 are closed. However, as odd position switches 21 and 31 are in parallel, the above traced circuit for the relay R is maintained closed through odd position switch 31.

The circuit to motor 20 is opened by opening of odd position switch 23 and the regulator 2 therefore stays in the new position until the regulator 3 has moved to a similar position. The regulator 2 cannot move further in the raise position, although relay R is energized, because odd position switch 23 is open; and the regulator 2 cannot be moved to lower the regulated voltage, because the relay L must be energized through normally closed contacts R3 which remain open as long as relay R is energized.

If, after the regulator 2 has moved to an even position, for some reason the motor 30 should fail to operate the regulator 3 to the new position, a timing relay 75 is energized through a circuit from line 10 through even position switch 22, conductor 77, contacts O3, conductor 69, coil 75 to line 11. If the trouble is not rectified within a predetermined time, relay 75 will close its contact 76 to control a device 80 which may be an alarm or may be a control device initiating some emergency control action such as momentarily opening the circuit at one of the controlling relays.

If, however, the normal action occurs and motor 30 operates the regulator 3 to its new similar even position in which the brushes of the movable contact 36 bridge two contacts 37, the cam actuator 35 will be moved to open odd position switches 31 and 33 and to close even position switches 32 and 34. Opening of odd position switch 33 deenergizes motor 30. As both odd position switches 21 and 31 are now open the circuits for coils O and R are broken and relays O and R return to their open positions.

However, closing of the even position switches has set up a circuit, opened only by the normally closed contacts O3, for energizing the relay E. This circuit extends from line 10 through the even position switch 22 or 32 in parallel, conductor 77, contacts O3 (when closed), coil E, contacts L4, contacts R4 (when closed), to line 11. Therefore, when relays O and R return to their open position, the above traced circuit is closed and relay E is energized.

The relay E can therefore be energized only if all the odd position switches have been opened, and, similarly, the relay O can be energized only if all of the even position switches have been opened. If more than two regulators are being kept in step by the present control system, additional odd and even position switches, energized by similar cam actuators on such additional regulators, would be provided in parallel with odd position switches 21 and 31 and in parallel with even position switches 22 and 32. Thus, although there may be four or more regulators controlled, no one regulator could be further actuated until all regulators have moved to the corresponding position.

With the relay E energized, a circuit is set up through even position switches 22 or 32 and the contacts E2 of relay E so as to apply voltage through conductors 81 and 67 so that a circuit may be closed, dependent upon the position of the primary relay 12, to close a circuit through conductor 70 and normally closed contacts R3 to energize relay L, or to close a circuit through conductor 68 and normally closed contacts L3 to energize relay R. An operation of the regulators 2 and 3 to the next tap position would again take place.

Additional machines to be regulated would have odd and even position switches connected in parallel with switches 21, 22 and 31, 32 as above described, and would also have similar additional contacts similar to odd position switches 23 and 33 and even position switches 24 and 34 controlling the motor circuits of the additional regulators. No additional relays would be necessary, merely additional contacts on the relays O, E, L and R to similarly control the additional motor circuits. The present system is therefore very simple although applied to any number of regulators to be kept in step and is independent of the time that a movable contact 26 or 36 is moving from one position to another. To aid in clarifying the drawing, the usual limit switches, starting switches, fuses, etc., in the motor and relay circuits have been omitted.

Although but one embodiment of the present invention has been illustrated and described it will be apparent to those skilled in the art that various changes and modifications may be made therein without departing from the spirit of the invention or from the scope of the appended claims.

It is claimed and desired to secure by Letters Patent:

1. In a control system for a plurality of motors, in combination, an odd position selector relay provided with normally open contacts and a normally closed contact, an even position selector relay provided with normally open contacts and a normally closed contact, a source of energy; a control unit associated with each said motor, each said unit comprising two odd position switches actuated in response to movement of its motor into an odd position, two even position switches actuated in response to movement of its motor into an even position, an odd energizing circuit for connecting its motor to said source comprising one of said odd position switches and one of said normally open contacts of said odd position selector relay, and an even energizing circuit for connecting its motor to said source comprising one of said even position switches and one of said normally open contacts of said even position selector relay; a source of control energy, and means for selectively energizing said relays comprising a circuit for connecting said odd position selector relay to said control source including one of said odd position switches and said normally closed contact of said even position selector relay, and a circuit for connecting said even position selector relay to said control source including one of said even position switches and said normally closed contact of said odd position selector relay.

2. In a control system for a plurality of motors, in combination, an odd position selector relay provided with normally open contacts and a normally closed contact, an even position selector relay provided with normally open contacts and a normally closed contact, a source of energy; a control unit associated with each said motor, each said unit comprising an odd position motor switch and an odd position relay switch both actuated in response to movement of its motor into an odd position, an even position motor switch and an even position relay switch both actuated in response to movement of its motor into an even position, an odd energizing circuit for connecting its motor to said source comprising said odd position motor switch and one of said normally open contacts of said odd position selector relay, and an even energizing circuit for connecting its motor to said source comprising said even position motor switch and one of said normally open contacts of said even position selector relay; a source of control energy, and means for selectively energizing said relays comprising a circuit for connecting said odd position selector relay to said control source comprising said normally closed contact of said even position selector relay in series with a plurality of parallel circuit branches, each said branch including one said odd position relay switch, and a circuit connecting said even position selector relay to said control source comprising said normally closed contact of said odd position selector relay in series with a second plurality of parallel circuit branches, each of said second plurality of branches including one said even position relay switch.

3. In a control system for a plurality of motors, in combination, an odd position selector relay, a plurality of contact elements operated in response to energization and deenergization of said odd position selector relay, an even position selector relay, a plurality of contact elements operated in response to energization and deenergization of said even position selector relay, a source of energy; a control unit associated with each said motor, each said unit comprising two odd position switches actuated in response to movement of its motor into an odd position, two even position switches actuated in response to movement of its motor into an even position, an odd energizing circuit for connecting its motor to said source comprising one of said odd position switches and one of said contact elements, and an even energizing circuit for connecting its motor to said source comprising one of said even position switches and one of said contact elements; a source of control energy, and means for selectively energizing said relays comprising a circuit connecting said odd position selector relay to said control source including one of said odd position switches and one of said contact elements operated to a closed position by deenergization of said even position selector relay, and a circuit for connecting said even position selector relay to said control source including one of said even position switches and one of said contact elements operated to a closed position by deenergization of said odd position selector relay.

4. In a control system for a plurality of motors, in combination, an odd position selector relay, a plurality of contact elements operated in response to energization and deenergization of said odd position selector relay, an even position selector relay, a plurality of contact elements operated in response to energization and deenergization of said even position selector relay, a source of energy; a control unit associated with each said motor, each said unit comprising an odd position motor switch and an odd position relay switch both actuated in response to movement of its motor into an odd position, an even position motor switch and an even position relay switch both actuated in response to movement of its motor into an even position, an odd energizing circuit for connecting its motor to said source comprising one of said odd position motor switches and one of said contact elements, and an even energizing circuit for connecting its motor to said source comprising one of said even position motor switches and one of said contact elements; a source of control energy, and means for selectively energizing said relays comprising a circuit connecting said odd position selector relay to said control source including a plurality of parallel circuit branches, each said branch including one said odd position relay switch, and a circuit connecting said even position selector relay to said control source including a second plurality of parallel circuit branches, each said second plurality of branches including one said even position relay switch.

5. In a control system for a plurality of motors, in combination, a source of energy; a control unit associated with each motor, each said unit comprising an energizing circuit for connecting its motor to said source, a switch opened by movement of its motor from one position to a next position for opening said circuit, and switch means operated responsive to simultaneous positioning of all said motors in said next position for simultaneously reclosing said circuit; and switch means common to said motors for simultaneously closing said circuits from said source to said motors when all said motors are in said one position to cause said motors to be all actuated through said next position.

LOUIS C. AICHER.

REFERENCES CITED

The following references are of record in the file of this patent:

UNITED STATES PATENTS

| Number | Name | Date |
|---|---|---|
| 1,063,377 | Norwood | June 3, 1913 |
| 1,790,188 | White | Jan. 27, 1931 |
| 1,888,267 | Hershey | Nov. 22, 1932 |
| 1,945,665 | Stewart | Feb. 6, 1934 |
| 2,330,063 | Lennox | Sept. 21, 1943 |
| 2,389,204 | Ludi et al. | Nov. 20, 1945 |